United States Patent [19]
Momose

[11] Patent Number: 5,122,322
[45] Date of Patent: Jun. 16, 1992

[54] METHOD OF PRODUCING COMPOSITE THERMOPLASTIC RESIN FILM

[75] Inventor: Yoshiaki Momose, Hadano, Japan

[73] Assignee: JSP Corporation, Tokyo, Japan

[21] Appl. No.: 662,413

[22] Filed: Feb. 28, 1991

Related U.S. Application Data

[60] Division of Ser. No. 455,020, Dec. 22, 1989, Pat. No. 5,019,439, which is a continuation-in-part of Ser. No. 335,852, Apr. 10, 1989, abandoned.

[30] Foreign Application Priority Data

Apr. 12, 1988 [JP] Japan .................................. 63-88244
Apr. 22, 1988 [JP] Japan .................................. 63-99720

[51] Int. Cl.$^5$ ............................................. B29C 47/06
[52] U.S. Cl. ...................... 264/174; 156/244.25; 264/108; 264/171; 425/131.1
[58] Field of Search ............... 264/171, 174, 108; 425/131.1, 133.1, 133.5, 462, 380, 376.1; 156/244.25, 500

[56] References Cited

U.S. PATENT DOCUMENTS

| | | |
|---|---|---|
| 3,142,599 | 7/1964 | Chavannes . |
| 3,239,197 | 3/1966 | Tollar .................. 264/171 |
| 3,557,265 | 1/1971 | Chisholm et al. ........... 264/171 |
| 3,565,985 | 2/1971 | Schrenk et al. ........... 264/171 |
| 3,577,308 | 5/1971 | Drunen et al. . |
| 3,817,675 | 6/1974 | Maiocco .................. 425/376.1 |
| 3,833,704 | 9/1974 | Nissel . |
| 3,918,865 | 11/1975 | Nissel . |
| 3,950,476 | 4/1976 | Fontijn .................. 156/244.18 |
| 4,344,536 | 8/1982 | Oberhuber . |
| 4,467,084 | 8/1984 | Kitagawa et al. . |
| 4,482,695 | 11/1984 | Barbee et al. . |
| 4,615,922 | 10/1986 | Newsome et al. . |
| 4,628,549 | 12/1986 | Lazar . |
| 4,731,216 | 3/1988 | Topolski .................. 425/380 |
| 4,764,406 | 8/1988 | Hisazumi et al. . |
| 4,816,308 | 3/1989 | Shimizu et al. ........... 428/336 X |
| 4,868,026 | 9/1989 | Shimizu et al. ........... 428/475.2 X |
| 4,908,272 | 3/1990 | Harada et al. ........... 428/412 |

FOREIGN PATENT DOCUMENTS 7040851 9/1971 France .
57-208244 12/1982 Japan .
6711464 2/1969 Netherlands .

Primary Examiner—Jeffery Thurlow
Attorney, Agent, or Firm—Stephen F. K. Yee

[57] ABSTRACT

A composite, thermoplastic resin film includes a matrix in the form of a film, and formed of a first thermoplastic resin and a plurality of substantially continuous tapes dispersed within the matrix film with the plane of each of the tapes being substantially parallel with the plane of the matrix film and each formed of a second thermoplastic resin different from the first resin, a portion of the tapes having a width of at least 200 times the thickness of the composite film so that the composite film has an oxygen permeation rate of 0.12–900 cc/m$^2$.day.atm at a temperature of 20° C. and a relative humidity of 65%. A method for producing the thermoplastic resin film includes mixing melts of the first and second resins using a static mixer, and extruding the mixed melt discharged from the mixer as is through a die. The film has an excellent gas barrier property and is suitably used for the preparation of cushioning materials.

8 Claims, 4 Drawing Sheets

METHOD OF PRODUCING COMPOSITE THERMOPLASTIC RESIN FILM

CROSS-REFERENCE TO RELATED APPLICATIONS

This application is a division of application Ser. No. 07/455,020, filed Dec. 22, 1989, now U.S. Pat. No. 5,019,439, issued May 28, 1991, which in turn is a continuation-in-part application of application Ser. No. 07/335,852, filed Apr. 10, 1989, and now abandoned.

BACKGROUND OF THE INVENTION

This invention relates to a thermoplastic resin film having a good gas barrier property and to a method of producing same. The present invention is also directed to a cushioning material using the above film.

One known thermoplastic resin film having a gas barrier property is a composite film having a core, gas barrier layer formed of a polyamide, two adhesive layers provided on both sides of the core layer, and two surface layers formed of a polyolefin and provided for covering the adhesive layers. Such a composite film, however, is difficult to prepare and requires a complicated extrusion machine. Additionally, there is not available a fully suitable adhesive for bonding the surface layers to the core layers.

A gas barrier film is also known which includes a matrix film formed of a polyolefin and containing fine particulate resin having a gas barrier property and uniformly dispersed in the matrix. While such a blend film may be fabricated more easily as compared with the above composite film, the gas barrier property of the blend film is not so excellent as the composite film, unless the particulate resin is used in a large amount. Further, the blend film lacks clarity because of the light scattering caused by the very fine particulate resin contained in the film.

U.S. Pat. No. 3,950,476 discloses a synthetic film containing at least two unmixed polymeric components, which film is characterized in that at least one of the components occurs in the form of substantially endless or continuous threads in the longitudinal direction of the film. The threads have transverse dimensions that are at least a few times, for instance at least two to five times, smaller than the thickness of the film, and the threads are embedded in a basic mass of a different polymeric component. Because of the presence of the threads, this film has a high strength and is suitable to be used for packing of heavy weight granular materials such as cement. This United States patent is silent with respect to gas permeability of the film. Because the embedded components are in the form of threads, the film has poor gas barrier properties.

SUMMARY OF THE INVENTION

It is an object of the present invention to provide a composite, thermoplastic resin film which is devoid of the foregoing problems of the conventional gas barrier films.

Another object of the present invention is to provide a cushioning material having excellent mechanical properties and excellent gas barrier properties.

In accordance with one aspect of the present invention, there is provided a composite, thermoplastic resin film comprising a matrix in the form of a film and formed of a first thermoplastic resin, and a plurality of substantially continuous tapes dispersed within said matrix with the plane of each of said tapes being substantially parallel with the plane of said matrix and each formed of a second thermoplastic resin different from said first resin, a portion of said tapes having a width of at least 200 times the thickness of said matrix so that the composite film has an oxygen permeation rate of 0.12–900 cc/m$^2$.day.atm at a temperature of 20° C. and a relative humidity of 65%.

In another aspect, the present invention provides a cushioning material comprising two, first and second films, at least one of said first and second films being formed to provide one or more discrete embossments, and said first and second films being bonded to form a substantially unitary structure and to seal said embossments so that one or more air-tight cells are defined between said first and second films, characterized in that at least one of said first and second films is the above composite, thermoplastic resin film.

The present invention also provides a method of fabricating a composite, thermoplastic film, comprising the steps of:

providing a first melt of a first thermoplastic resin;

providing a second melt of a second thermoplastic resin different from said first resin;

continuously feeding said first and second melts simultaneously to an inlet port of a static mixer and allowing them to pass therethrough, so that a mixture comprising a matrix formed of said first resin, and a plurality of substantially continuous, parallel tapes dispersed within said matrix is formed;

continuously discharging said mixture from an outlet port of said static mixer;

and continuously extruding said mixture through a die.

BRIEF DESCRIPTION OF THE DRAWINGS

Other objects, features and advantages of the present invention will become apparent from the detailed description of the invention which follows, when considered in light of the accompanying drawings, in which.

DETAILED DESCRIPTION OF THE INVENTION

Figure 1:
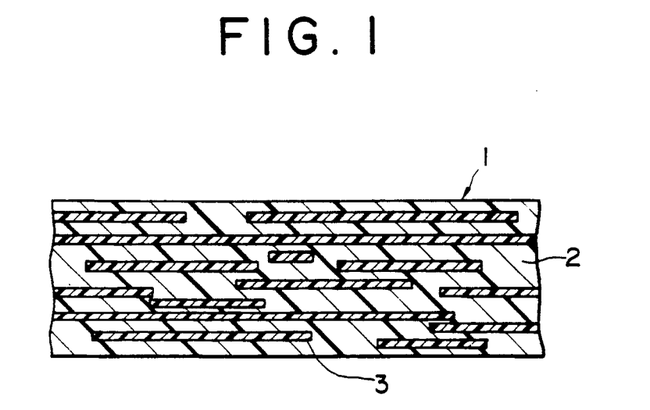
FIG. 1 is a cross-sectional view schematically showing a thermoplastic resin film according to the present invention.

Referring first to FIG. 1, designated generally as 1 is a thermoplastic film according to the present invention. The film 1 is composed of a matrix film 2 formed of a first thermoplastic resin, and a plurality of substantially continuous tapes 3 formed of a second thermoplastic resin exhibiting better gas barrier property (lower gas-permeability) than that of the first resin and generally substantially uniformly dispersed within the matrix 2. The plane of each of the tapes 3 is substantially parallel with the plane of the matrix 2.

Each of the tapes 3 generally has a width of 75 μm or more. The gas barrier property of the film 1 becomes better as the width of the tape 3 becomes larger. Thus, it is important that a portion of the tapes 3 should have a width of at least 200 times, preferably 1000 times the thickness of the matrix 2. The presence of one or more tapes 3 having the same width of the matrix 2 is most preferred. The thickness of the tapes 3 is preferably in the range of 0.05 to 10 μm, more preferably 0.1 to 5 μm. The content of the tapes 3 is preferably 1–40%, more preferably 1–25% based on the total volume of the tapes 3 and the matrix 2. The thickness of the matrix varies with the purpose for which the film 1 is used, but generally in the range of 2.5 μm to 1.6 mm. When the film 1 is to be used as a film for forming a cushioning material, the matrix 2 preferably has a thickness of 2.5–80 μm, more preferably 5–30 μm. In case where the film 1 is intended to be used as a wrapping film, the matrix 2 preferably has a thickness of 0.02–1.6 mm, more preferably 0.05–0.4 mm.

As a result of the above construction, the thermoplastic resin film of the present invention can exhibit significantly improved gas barrier property as compared with a known film having dispersed therein fine particles of the second thermoplastic resin. More specifically, since a plurality of gas barrier tapes 3 are dispersed in the matrix 2, the gas barrier property of the film 1 is comparable to that of a known laminated film. Further, since no fine particles are present in the matrix 2, the film 1 shows good clarity or see-through property.

In particular, the thermoplastic resin film 1 has an oxygen permeation rate of 0.12–900 cc/m$^2$.day.atm at a temperature of 20° C. and a relative humidity of 65%. When the film 1 is to be used as a film for forming a cushioning material, the oxygen permeation rate of the film 1 is preferably 0.24–900, more preferably 0.24–480 cc/m$^2$.day.atm. In case where the film 1 is intended to be used as a wrapping film, the oxygen permeation rate of the film 1 is 0.12–900, preferably 0.12–480 cc/m$^2$.day.atm.

The first resin may be, for example, a polyolefin such as polyethylene or polypropylene, a polystyrene, a polyacrylonitrile, a polyester, a polycarbonate, a polyvinyl chloride, or a modified resin thereof. The second resin may be, for example, a polyamide, a saponified ethylene-vinyl acetate copolymer, an ethylene-vinyl alcohol copolymer, a polyvinylidene chloride or a polyacrylonitrile copolymer. The use of a polyamide such as a m-xylylenediamine-type polyamide, Nylon 6 or Nylon 6,6 as the second resin is preferred for reasons of good gas barrier properties.

The m-xylylenediamine-type polyamide may be a polymer containing at least 70 mole % of a segment obtained by reaction of (A-1) m-xylylenediamine or (A-2) a mixture of at least 70 mole % of m-xylylenediamine and less than 30 mole % of p-xylylenediamine with (B) an α,ω-aliphatic dicarboxylic acid having 6–10 carbon atoms. Illustrative of suitable m-xylylenediamine type polyamide are poly(m-xylylenediadipamide), poly(m-xylylenesebacamide), poly(m-xylylenesberamide), m-xylylene/p-xylyleneadipamide copolymer, m-xylylene/p-xylylenepimelamide copolymer, m-xylylene/p-xylylenenazelamide, copolymers of the above with an aliphatic amine such as hexamethylenediamine, an alicyclic amine such as piperazine, an aromatic diamine such as p-bis(2-aminoethyl)benzene, an aromatic dicarboxylic acid such as terephthalic acid, lactum such as ε-caprolactum, a ω-aminoaliphatic carboxylic acid such as ω-aminoheptanoic acid, or an amino aromatic carboxylic acid such as p-aminobenzoic acid.

Figure 2:
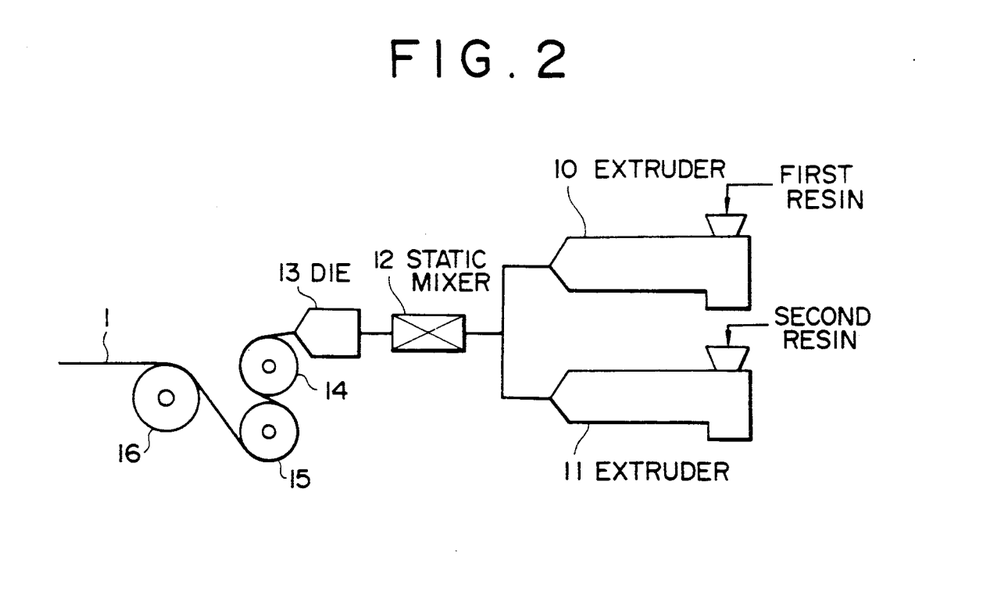
FIG. 2 is a schematic illustration showing an apparatus suitable for fabricating a thermoplastic resin film according to the present invention.

FIG. 2 depicts one preferred embodiment of an apparatus for the fabrication of the above-described film according to the present invention. A first resin for forming the matrix 2 is fed to an extruder 10, while a second resin for forming the tape 3 is fed to an extruder 11, where they are melted. The melts are continuously extruded from the extruders 10 and 11 and simultaneously introduced into a static mixer 12 where they are mixed and divided into layers.

By the term "static mixer" is meant a motionless mixer, sometimes called an interfacial surface generator, in which a stream of liquid is divided, laterally expanded and recombined to provide mixing. Such a static mixer is known and commercially available.

Figure 3:
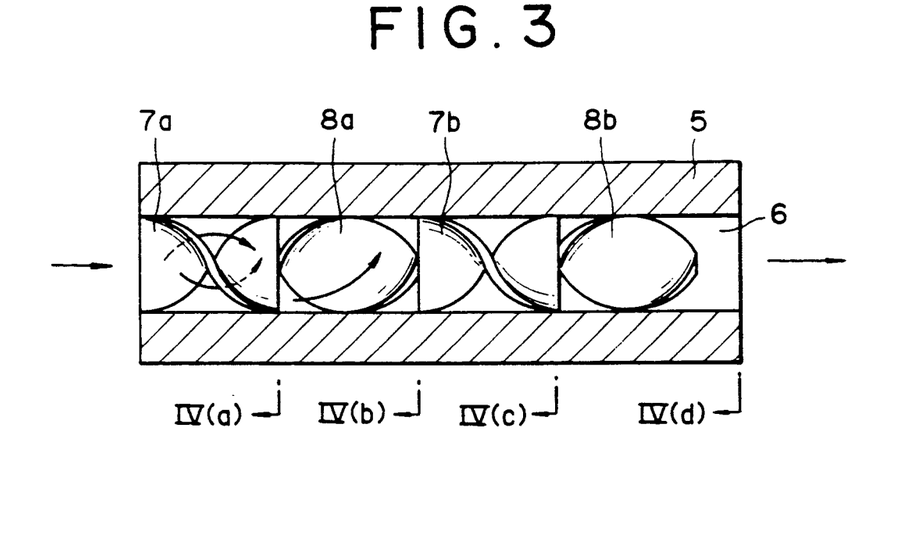
FIG. 3 is a longitudinal, sectional view diagrammatically showing a static mixer used in FIG. 2.
Figure 4A:
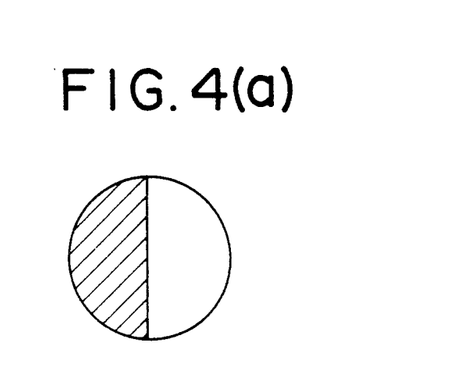
FIGS. 4(a) through 4(d) are cross-sectional views taken on lines IV(a)–IV(a) through IV(d)–IV(d), respectively in FIG. 3, explanatory of how a stream of melt is mixed and divided in various stages in the static mixer.
Figure 4B:
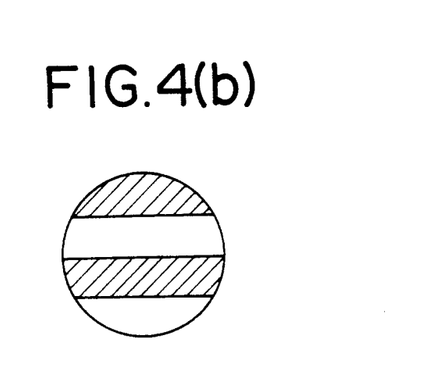
Figure 4C:
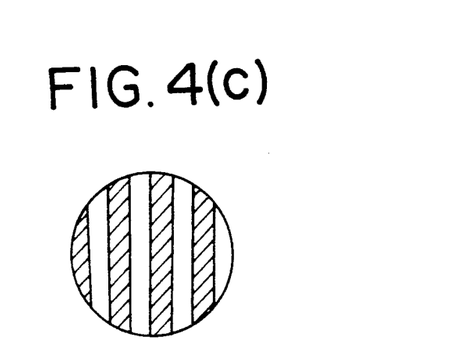
Figure 4D:
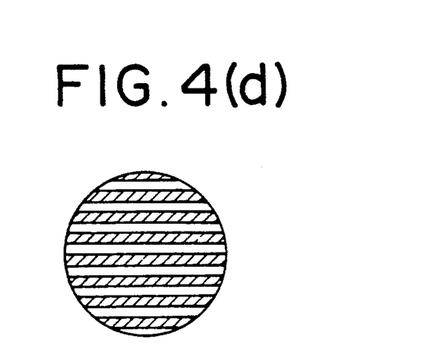

One preferred static mixer is diagrammatically shown in FIG. 3, in which the reference numeral 5 denotes a tubular housing defining an axially extending fluid flow passage 6 therein. A plurality (four in the illustrated case) of twisted baffle elements 7a, 8a, 7b and 8b are disposed in the passage 6. These elements are twisted through an angle of 180°. The elements 7a and 7b are each twisted in the direction opposite to that of the elements 8a and 8b. As shown in FIG. 3, the clockwise and counterclockwise elements are alternately arranged with the edge of one element (e.g. element 8a) being oriented perpendicularly to its adjacent element (e.g. element 7b).

Thus, a liquid introduced into the passage 6 is divided into two streams and is rotated clockwise through an angle of 180° upon passage through each of the elements 7a and 7b and counterclockwise through the same angle upon passage through each of the elements 8a and 8b. Further, the liquid moves laterally from the center portion toward the periphery portion and from the periphery portion toward the center portion. As a result, as shown in FIGS. 4(a) through 4(d), the liquid is divided and layered into 16 layers after passage through the four elements 7a, 8a, 7b and 8b. The inside diameter of the tubular housing 5 and the number of the elements 7 and 8 have an influence upon the width of the tapes 3 (FIG. 1). For the purpose of the present invention, the inside diameter of the tubular housing 5 is preferably 10–50 mm, more preferably 20–40 mm and the total number of the elements 7 and 8 are preferably 5–15, more preferably 8–12.

The resin melt thus mixed in the static mixer 12 is then extruded through a T-die 13 into a film. The extrudate in the form of a film is cooled during its passage around the cooling rolls 14 and 15 and is guided by a guide roll 16 to a take-up roll (not shown) as a product film 1 whose cross section along a line perpendicular to the direction along which the film runs is as shown in FIG. 1.

In the thermoplastic film thus obtained, a portion of the tapes 3 can be exposed on the surface. While this does not adversely affect the gas barrier property of the film, other properties thereof, such as smoothness of the surface and resistance to water, are subjected to the property of the resin forming the tapes 3. In a preferred embodiment according to the present invention, one or two outer films are laminated on at least one side of the matrix 2. The outer film or films are each formed of a third thermoplastic resin different from the resin of which the tapes 3 are formed. The third resin may be the same as the first resin of which the matrix 2 is formed.

Figure 5:
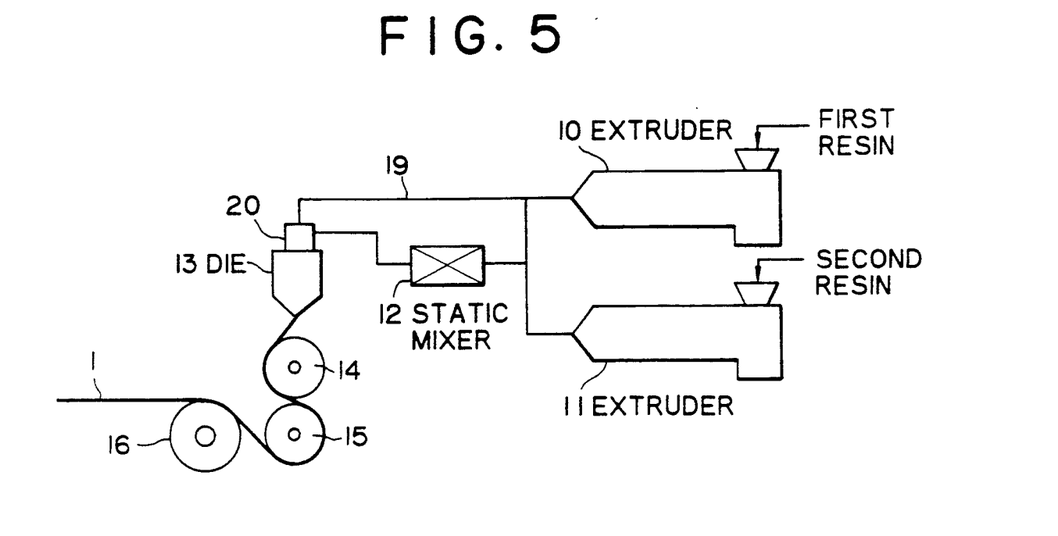
FIG. 5 is a view similar to FIG. 2 showing an apparatus suitable for fabricating another type of a thermoplastic resin film according to the present invention.

Such a laminate film may be suitably prepared in a manner as illustrated in FIG. 5, in which the same reference numeral designates similar component part as in FIG. 2. In the embodiment shown in FIG. 5, the same resin is used as the first resin for the formation of the matrix and as the third resin for the formation of the outer film. In the manner described above with reference to FIG. 2, first and second resins are continuously extruded from extruders 10 and 11, respectively, and the extrudates are combined and introduced into a static mixer 12 for layering. The layered mixture discharged from the static mixer 12 is introduced into a laminating device 20 where the layered mixture is laminated with a layer of the first resin introduced from the extruder 10 through a line 19. The laminate is then extruded through a T-die 13 into a laminate film 1. The film 1 is cooled and collected in the same manner as in FIG. 2.

Such a laminate film may also be prepared by superimposing a film or two films of the third resin and the film obtained in the manner as described previously with reference to FIG. 2, and compression molding the superimposed layers with heating to form an integrally laminated film.

As will be appreciated from the above, the thermoplastic resin film according to the present invention can be fabricated in a simpler way as compared with known five-layered composite film. The film of the present invention exhibits gas barrier property comparable to the known composite film and far superior gas barrier property as compared to known film containing particles of a gas barrier resin. In addition, the inventive film is clear and has good see-through property. Thus, the film according to the present invention is suitably used as a wrapping or packaging film. Further, the thermoplastic resin film of the present invention is advantageously used for the formation of a cushioning material.

Figure 6:
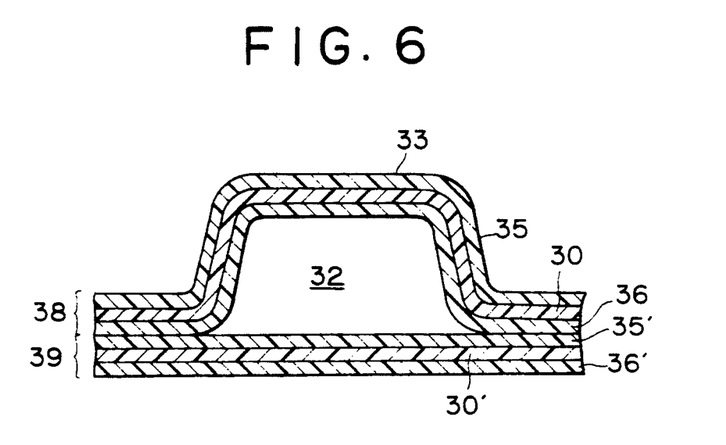
FIGS. 6 through 8 are cross-sectional views schematically illustrating cushioning materials according to the present invention.

One preferred cushioning material is schematically illustrated in FIG. 6. The cushioning material which is designated includes two, first and second films 38 and 39. At least one of the first and second films 38 and 39 (the first film 38, in the illustrated case) is formed to provide one or more discrete embossments 33. The first and second films 38 and 39 are bonded to form a substantially unitary structure and to seal the embossments 33 so that one or more air-tight cells 32 are defined between the first and second films 38 and 39. At least one of the first and second films 38 and 39 (both first and second films 38 and 39 in the illustrated case) is the thermoplastic film according to the present invention. In the illustrated embodiment, each of the thermoplastic films 38 and 39 is a laminated film having a core, matrix film 30 (30′) in which a plurality of thermoplastic tapes (not shown) are dispersed as described previously, and two outer films 35 (35′) and 36 (36′) provided one on each side of the core film 30 (30′).

Figure 7:
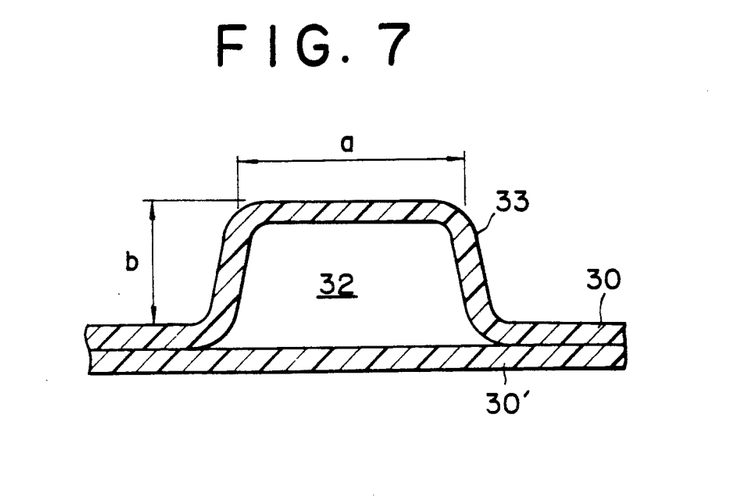
Figure 8:
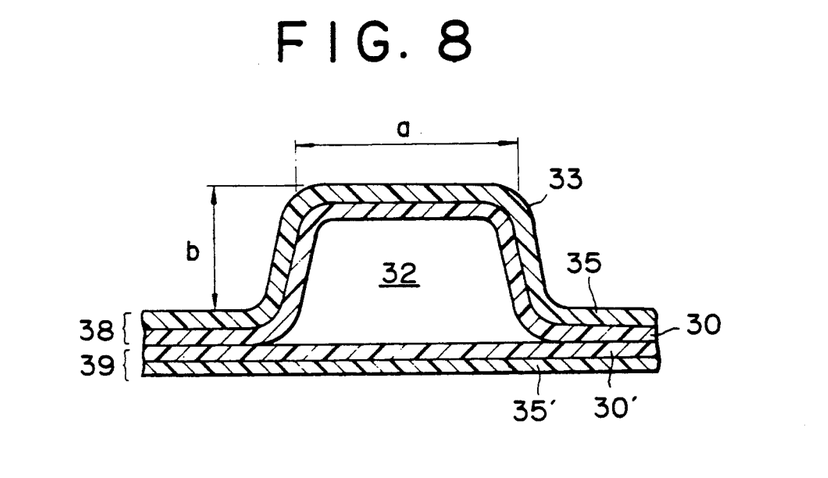

FIGS. 7 and 8 show alternate embodiments of the cushioning material of the present invention, in which the same reference numerals designate similar component parts. The cushioning material of FIG. 7 is formed from two films 30 and 30′ each having no outer films, while the cushioning material of FIG. 8 is formed from two laminated films 38 and 39 each having an outer film 35 (35′) provided over one side of the matrix film 30 (30′).

The following examples will further illustrate the present invention. In the following examples, "haziness", "oxygen permeability" and "creep resistance" are measured by the following methods:

Haziness is measured in accordance with ASTM D883-62T using a digital haziness measuring device NDH-2D manufactured by Nihon Denshoku Kogyo K. K. and is defined by the following equation:

$$H = T_d/T_0 \times 100 \; (\%)$$

where H represents haziness, $T_d$ represents a diffuse transmission factor and $T_0$ represents a total transmissivity.

Oxygen permeability of a sample film is measured using OXTRAN 100 manufactured by Modern Control Inc. under conditions involving a temperature of 20° C., an inside relative humidity of 100% and an outside relative humidity of 65%. Oxygen permeation rate is calculated according to the equation:

Oxygen permeation rate = Oxygen permeability/Thickness of film

Creep resistance: A sample cushioning material is cut into squares with 100 mm sides. The cut samples are superimposed one over another until the total height becomes 100 mm when a pressure of 2 kgf is applied. Then the superimposed samples are allowed to stand at a temperature of 23° C. and a relative humidity of 65% for 15 days while applying a load of 2 kgf. Creep resistance is defined by the following equation:

$$CR = (H_0 - H_1)/H_0$$

where CR represents creep resistance, $H_0$ is the initial total height of the superimposed samples (i.e. 100 mm) and $H_1$ is a total height of the superimposed samples after the 15 days.

EXAMPLE 1

A film consisting of a matrix film in which a plurality of tapes were dispersed was prepared using an apparatus as shown in FIG. 2. A polyethylene (Melt Index: 2.0 g/10 min; hereinafter referred to as PE) was used as a first thermoplastic resin for forming the matrix film, while a poly(m-xylyleneadipamide) (hereinafter referred to as MXD6) was used as a second thermoplastic resin for forming the tapes. The first resin was extruded from an extruder having an inside cylinder diameter of 50 mm at a cylinder temperature of 260° C. and a discharge rate of 10 kg/hour. The second resin was extruded from an extruder having an inside cylinder diameter of 30 mm at a cylinder temperature of 260° C. The extrudates were continuously fed to a static mixer composed of a tubular housing having an inside diameter of 30 mm and seven twisted baffle elements disposed in series within the tubular housing. The layered mixture discharged from the static mixer was extruded through a T-die to obtain a film having a thickness of 50 μm and a content of the tapes (i.e. second resin) of 5% based on the volume of the matrix (i.e. first resin) The film was tested for its haziness and oxygen permeability. The results were as summarized in Table 1 below.

EXAMPLE 2

Example 1 was repeated in the same manner as described except that nylon 6 (hereinafter referred to as N-6) was used in lieu of MXD-6. The results are shown in Table 1.

EXAMPLE 3

Example 1 was repeated in the same manner as described except that polystyrene (hereinafter referred to as PS) was used in lieu of polyethylene as the first resin and that the discharge rate of the second resin in the extruder was increased so that the amount of the second resin was increased to 25% based on the volume of the first resin. The results are shown in Table 1.

EXAMPLE 4

Example 3 was repeated in the same manner as described except that nylon 6 was used in lieu of MXD-6. The results are shown in Table 1.

EXAMPLE 5

Example 1 was repeated in the same manner as described except that the discharge rate of the second resin in the extruder was increased so that the amount of the second resin was increased to 35% based on the volume of the first resin. The results are shown in Table 1.

EXAMPLE 6

Example 5 was repeated in the same manner as described except that nylon 6 was used in lieu of MXD-6. The results are shown in Table 1.

COMPARATIVE EXAMPLE 1

Example 1 was repeated in the same manner as described except that the second resin (MXD6) was not used, thereby to obtain a film formed of polyethylene whose properties are shown in Table 1.

COMPARATIVE EXAMPLE 2

Comparative Example 1 was repeated in the same manner as described except that polystyrene was used in lieu of polyethylene. The results are shown in Table 1.

COMPARATIVE EXAMPLE 3

100 Parts by volume of PE and 25 parts by volume of N-6 were mixed with an extruder and then extruded through a die to obtain a film having a thickness of 50 $\mu$m. Thus no static mixer was used. The film had properties shown in Table 1.

EXAMPLE 7

A composite film consisting of a core, matrix film in which a plurality of tapes were dispersed, and two outer films provided one over each side of the core film was prepared using an apparatus as shown in FIG. 5. Polyethylene (melt index: 2.0 g/10 min) was used as the first and third resins for forming the matrix and outer films. As a second resin for forming the tapes, MXD6 was used. The first and second resins were extruded with the extruders used in Example 1 and mixed with the static mixer used in Example 1. The layered mixture was combined with the third resin (the same as the first resin) and the extruded through a T-die to obtain the composite film having a total thickness of 350 $\mu$m. The two outer films each had a thickness of about 100 $\mu$m. The content of the tapes (i.e. second resin) in the core, matrix film was 10% based on the volume of the matrix (i.e. first resin) and the tapes (i.e. second resin). The composite film thus obtained had an oxygen permeability of 7.2 cc mm/m$^2$.day.atm The outer layers were found to be tightly adhered to the core layer.

EXAMPLE 8

Example 7 was repeated in the same manner as described except that the amount of the tapes was increased to 20% by volume based on the matrix. The resulting composite film had an oxygen permeability of 4.5 cc mm/m$^2$ day atm and showed excellent inter-layer bonding.

COMPARATIVE EXAMPLE 4

Example 8 was repeated in the same manner as described except that the mixing of the first and second resins was effected in the extruder rather than the static mixer. The resulting composite film had an oxygen permeability of 83.3 cc mm/m$^2$ day atm and showed excellent inter-layer bonding. The see-through property of this film was bad (i.e. haziness was high) as compared with those of Examples 7 and 8.

EXAMPLE 9

A cushioning material as shown in FIG. 7 was prepared. Each embossment 33 had a top diameter ("a" in FIG. 7) of 10 mm and a height ("b" in FIG. 7) of 4 mm. The embossments were spaced apart from neighboring ones with a distance of 10 mm. The thicknesses of the films 30 and 30' were 30 $\mu$m and 20 $\mu$m, respectively. The films 30 and 30' were prepared in a manner similar to that in Example 1 and were each composed of a matrix formed of a polyethylene and a plurality of tapes formed of MXD6 and dispersed in the matrix. The con-

TABLE 1

| Example | First Resin | Second Resin (amount vol %) | Haziness (%) | Permeability (cc · mm/ m$^2$ · day · atm) | Permeation rate (cc/m$^2$ · day · atm) |
| --- | --- | --- | --- | --- | --- |
| 1 | PE | MXD6 (5) | 10.1 | 5.9 | 118.0 |
| 2 | PE | N-6 (5) | 13.6 | 38.6 | 772.1 |
| 3 | PS | MXD6 (25) | 4.3 | 1.3 | 26.1 |
| 4 | PS | N-6 (25) | 18.7 | 11.1 | 222.4 |
| 5 | PE | MXD6 (35) | 9.0 | 0.8 | 16.1 |
| 6 | PE | N-6 (35) | 24.0 | 8.2 | 164.8 |
| Comp. 1 | PE | — | 10.4 | 120.0 | 2400.0 |
| Comp. 2 | PS | — | 3.8 | 68.0 | 1360.2 |
| Comp. 3 | PE | N-6 (25) | 39.1 | 96.3 | 1926.5 |
| Comp. 9* | PE | N-6 (25) | 19.2 | 91.2 | 1820.6 |

*Film of U.S. Pat. No. 3,950,476 tent of MXD6 in each of the films 30 and 30' was 5% based on the volume of the matrix (polyethylene) and tapes (MXD6). The haziness, oxygen permeability and creep resistance of the cushioning material are summarized in Table 2.

EXAMPLES 10-12

Example 9 was repeated in the same manner as described except that the content of MXD6 was increased to 15% (Example 10), 25% (Example 11) and 35% (Example 12) based on the volume of the polyethylene matrix and MXD6 tapes. The properties of the cushioning materials are shown in Table 2.

COMPARATIVE EXAMPLE 5

Example 9 was repeated in the same manner as described except that no MXD6 tapes were incorporated into each of the films 30 and 30'. The properties of the cushioning material are shown in Table 2.

COMPARATIVE EXAMPLE 6

Example 10 was repeated in the same manner as described except that the mixing of polyethylene and MXD6 was effected in the extruder rather than the static mixer. The resulting cushioning material had properties shown in Table 2.

TABLE 2

| Example | Amount of MXD6 (vol %) | Haziness (%) | Creep resistance (%) |
|---|---|---|---|
| 9 | 5 | 10.1 | 7 |
| 10 | 15 | 9.8 | 5 |
| 11 | 25 | 9.3 | 4 |
| 12 | 35 | 8.9 | 4 |
| Comp. 5 | 0 | 10.4 | 58 |
| Comp. 6 | 15 | 36.4 | 50 |

EXAMPLE 13

A cushioning material as shown in FIG. 8 was prepared. The films 38 and 39 were prepared in a manner similar to that in Example 7 except that the matrix film 30 (30') was provided with only one outer layer 35 (35') on its one side. Each of the matrix films 30 and 30' was composed of a matrix formed of a polyethylene and a plurality of tapes formed of MXD6 and dispersed in the matrix. Each embossment 33 had a top diameter ("a" in FIG. 8) of 10 mm and a height ("b" in FIG. 8) of 4 mm. The thicknesses of the layers 30, 30', 35 and 35' were 15 μm, 10 15 and 10 μm, respectively. The content of MXD6 in each of the films 30 and 30' was 10% based on the volume of the matrix (polyethylene) and tapes (MXD6). The haziness, oxygen permeability and creep resistance of the cushioning material are summarized in Table 3. The cushioning material had a high inter-layer bonding.

EXAMPLE 14

Example 13 was repeated in the same manner as described except that the content of MXD6 was increased to 30% based on the volume of the polyethylene matrix and MXD6 tapes. The properties of the cushioning materials are shown in Table 3.

COMPARATIVE EXAMPLE 7

Example 13 was repeated in the same manner as described except that no MXD6 tapes were incorporated into each of the films 30 and 30'. The properties of the cushioning material are shown in Table 3.

COMPARATIVE EXAMPLE 8

Example 14 was repeated in the same manner as described except that the mixing of polyethylene and MXD6 was effected in the extruder rather than the static mixer. The resulting cushioning material had properties shown in Table 3.

TABLE 3

| Example | Amount of MXD6 (vol %) | Haziness (%) | Creep resistance (%) |
|---|---|---|---|
| 13 | 10 | 10.7 | 8 |
| 14 | 30 | 13.4 | 6 |
| Comp. 7 | 0 | 6.2 | 58 |
| Comp. 8 | 30 | 28.7 | 45 |

COMPARATIVE EXAMPLE 9

Using the same first and second resins as in Example 4, a composite film was prepared in a manner as described in U.S. Pat. No. 3,950,476. The composite film had a thickness of 50 μm and contained substantially endless threads extending in the longitudinal direction of the film. The threads had a diameter of about 1 μm. The haziness, oxygen permeability and oxygen permeation rate of the film were as shown in Table 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of fabricating a composite thermoplastic resin film, comprising the steps of:
   providing a first melt of a first thermoplastic resin;
   providing a second melt of a second thermoplastic resin different from said first resin;
   continuously feeding said first and second melts simultaneously to an inlet port of a static mixer and allowing them to pass therethrough, so that a mixture comprising a matrix formed of said first resin, and a plurality of substantially continuous, parallel tapes dispersed within said matrix is formed;
   continuously discharging said mixture from an outlet port of said static mixer; and
   continuously extruding said mixture discharged from said static mixer as such through a die, thereby obtaining a composite, thermoplastic resin film comprising a matrix in the form of a film formed of the first thermoplastic resin, and a plurality of substantially continuous tapes dispersed within said matrix, with the plane of each of said tapes being substantially parallel with the plane of said film and each tape having a width of at least 200 times the thickness of the matrix so that the composite film has an oxygen permeation rate of 0.12–900 cc/m$^2$.day.atm at a temperature of 20° C. and a relative humidity of 65%.

2. A method as set forth in claim 1, wherein each of said tapes has a thickness in the range of 0.05 μm to 10 μm.

3. A method as set forth in claim 1, wherein the content of said tapes is 1–40% based on the total volume of said tapes and said matrix.

4. A method as set forth in claim 1, wherein the content of said tapes is 1–25% based on the total volume of said tapes and said matrix.

5. A method as set forth in claim 1, wherein said matrix has a thickness of from 2.5 μm to 1.6 mm.

6. A method as set forth in claim 5, wherein a portion of said tapes has a width of at least 1000 times the thickness of said matrix.

7. A method as set forth in claim 4, wherein said first resin is a polyolefin, a polystyrene, a polyacrylonitrile, a polyester, a polycarbonate, a polyvinyl chloride, or a modified resin thereof.

8. A method as set forth in claim 1, wherein said second resin is a polyamide, a saponified ethylene-vinyl acetate copolymer, an ethylene-vinyl alcohol copolymer, a polyvinylidene chloride or a polyacrylonitrile copolymer.

* * * * *